(12) United States Patent
Genschorek

(10) Patent No.: US 8,844,887 B2
(45) Date of Patent: Sep. 30, 2014

(54) TWO-PART ROOF HOOK

(75) Inventor: Gido Genschorek, Schwedt (DE)

(73) Assignee: HatiCon GmbH, Schwedt (DE)

( * ) Notice: Subject to any disclaimer, the term of this patent is extended or adjusted under 35 U.S.C. 154(b) by 85 days.

(21) Appl. No.: 12/602,509

(22) PCT Filed: Apr. 22, 2009

(86) PCT No.: PCT/DE2009/000559
§ 371 (c)(1),
(2), (4) Date: Dec. 1, 2009

(87) PCT Pub. No.: WO2010/060391
PCT Pub. Date: Jun. 3, 2010

(65) Prior Publication Data
US 2011/0248131 A1    Oct. 13, 2011

(30) Foreign Application Priority Data

Nov. 28, 2008   (DE) .................. 20 2008 016 000 U

(51) Int. Cl.
| | | |
|---|---|---|
| A47G 29/00 | (2006.01) | |
| D21G 1/02 | (2006.01) | |
| F16C 23/08 | (2006.01) | |
| F16C 13/02 | (2006.01) | |
| B30B 3/04 | (2006.01) | |
| H01L 31/048 | (2014.01) | |
| E04D 13/10 | (2006.01) | |
| F24J 2/52 | (2006.01) | |
| F24J 2/46 | (2006.01) | |

(52) U.S. Cl.
CPC ............... B30B 3/04 (2013.01); D21G 1/0226 (2013.01); F16C 23/086 (2013.01); F24J 2002/5226 (2013.01); Y02B 10/12 (2013.01); Y02E 10/50 (2013.01); F16C 13/02 (2013.01); Y02E 10/47 (2013.01); H01L 31/0482 (2013.01); F24J 2/5247 (2013.01); E04D 13/10 (2013.01); F24J 2002/4672 (2013.01); F24J 2002/4661 (2013.01); Y02B 10/20 (2013.01)
USPC . 248/220.22; 248/237; 248/148; 248/292.12; 248/536; 182/117; 52/90.2; 52/698; 52/27; 52/173.3; 52/90.1

(58) Field of Classification Search
USPC ............... 248/220.22, 237, 148, 292.12, 536; 182/45 R, 117; 52/90.2, 698, 27, 173.3, 52/90.1
See application file for complete search history.

(56) References Cited

U.S. PATENT DOCUMENTS 1,255,692 A * 2/1918 Bearden ................... 248/237
5,619,834 A * 4/1997 Chen ........................ 52/509

(Continued)

FOREIGN PATENT DOCUMENTS

| DE | 10213902 A1 | 10/2003 |
| DE | 102005051625 A1 | 5/2006 |
| JP | 60261860 A | 12/1985 |

OTHER PUBLICATIONS

International Preliminary Report on Patentability dated May 31, 2011.

Primary Examiner — Terrell McKinnon
Assistant Examiner — Christopher Garft
(74) Attorney, Agent, or Firm — Patent Central LLC; Stephan A. Pendorf

(57) ABSTRACT

A two-part roof hook is described, which has a base part (1) and a hook part (2) which can be connected to the base part (1) and which has a connecting element (6) on its end (4) for mounting an assembly. The base part (1) is a cut-off portion (X) of an angle section, one angle leg (8) of which is provided with connecting elements (7) for making a connection to the roof substructure. A section wall (10) extending in the longitudinal direction of the section is arranged within the angle between the two angle legs (8, 9), which section wall includes an obtuse angle (α) jointly with the angle leg area of the connecting elements (7), serves as a support surface for the end (3) of the hook part (2), and can be connected to the end (3) of the hook part (2).

15 Claims, 2 Drawing Sheets

(56) References Cited

U.S. PATENT DOCUMENTS

| | | | |
|---|---|---|---|
| 6,698,702 B2 * | 3/2004 | Macri et al. | 248/237 |
| 7,195,099 B2 * | 3/2007 | Harney | 182/45 |
| 7,300,030 B2 * | 11/2007 | Michalo et al. | 248/309.1 |
| 7,658,353 B2 * | 2/2010 | Ford | 248/201 |
| 7,766,292 B2 * | 8/2010 | Liebendorfer | 248/237 |
| 2002/0109059 A1 * | 8/2002 | Macri et al. | 248/237 |
| 2002/0109060 A1 * | 8/2002 | Macri et al. | 248/237 |
| 2002/0195532 A1 * | 12/2002 | Macri et al. | 248/237 |
| 2003/0042377 A1 * | 3/2003 | Macri | 248/237 |
| 2009/0019796 A1 * | 1/2009 | Liebendorfer | 52/173.3 |
| 2011/0248131 A1 * | 10/2011 | Genschorek | 248/220.22 |

* cited by examiner

TWO-PART ROOF HOOK

BACKGROUND OF THE INVENTION

1. Field of the Invention

The invention refers to a roof hook for transferring the high loads associated with solar power systems into the substructure of roofs. Solar power systems can be based on photovoltaic modules or on solar collectors which are either mounted on support frames connected to the roof hook or are connected directly to the roof hook.

2. Description of the Related Art

The roof hook is passed through the roof covering and connected to the substructure of the roof, normally by means of holding screws or a form-fit connection (DE 20 2007 011 314 U1). The material used is bent flat steel sections which are usually made of stainless steel. A roof hook made of cast aluminium is known from EP 1 764 454 A2. An aluminium roof hook, without further specification as to the type of aluminium, is also disclosed in DE 20 2005 004 348 U1.

Furthermore, two-part roof hooks are known in the state of the art. They consist of a base part, which is connected to the roof substructure, and the hook part as such, which is passed through the roof covering and connected to the base part on the one hand and to the support frame for the solar modules on the other.

The base part and the hook part can be connected to each other rigidly, e.g. by welding, or releasably, e.g. by means of a bolt-nut connection. The term "two-part" as used in the present invention means a releasable connection.

The hook part can also be made in two parts to allow for additional height adjustment during mounting.

The general adjustment options are described in DE 20 2005 009 U1.

According to DE 201 19 478 U1, the releasable connection between the base part and the hook part is achieved by means of a screwed connection, which can include a height adjustment option according to DE 20 2005 019 897 U1.

As an alternative, form-fit connections between the base part and the hook part have been described, mainly with a view to lateral adjustment, i.e. displacement parallel to the mounting plane of the base part (DE 102 13 902 A1, DE 10 2005 058 065 A1, DE 20 2005 004 348 U1).

The above structures of two-part roof hooks essentially have in common that the base part comprises a portion which is perpendicular to the mounting plane on the roof substructure and to which the hook as such is flange-connected. Due to the lever arm of the hook part, this angle is subjected to high loads, which has led manufacturers to fall back on a well known principle, namely to arrange strengthening ribs or strengthening webs between the portion of the base part which is located in the mounting plane and the portion which is perpendicular thereto (DE 20 2006 009 674, EP 1 764 454 A2).

This measure to improve the load-bearing capacity entails higher production costs during the manufacture of roof hooks as a casting process has to be employed or additional shaping steps for integrally forming the webs are required.

The object of the invention is to propose a two-part roof hook, the base part of which has a high load-bearing capacity without requiring single strengthening webs or ribs and can be made of aluminium or an aluminium alloy.

BRIEF SUMMARY OF THE INVENTION

According to the invention, a two-part roof hook having a base part for making a connection to a roof substructure and a hook part which can be connected to the base part and which has a connecting element on its other end for mounting a support frame or an assembly located above the roof sheathing is proposed, the base part of which is a cut-off portion (X) of an angle section, preferably an aluminium extruded angle section, one angle leg of which has connecting elements for making a connection to the roof substructure, which connecting elements are spaced apart from the other angle leg, and wherein a section wall extending in the longitudinal direction of the section is arranged within the angle between the two angle legs, which section wall includes an obtuse angle ($\alpha$) jointly with the angle leg area of the connecting elements, serves as a support surface for the end of the hook part, and can be connected to this end of the hook part. The angle ($\alpha$) is preferably selected from the range of 110-145°.

The cross section of the base part can thus be described, in principle, as a right-angled triangle, one small side of which extends beyond the triangle and the hypotenuse of which serves as a support and connection surface to the hook part.

There are several alternative options for connection to the hook part.

According to a first embodiment, the section wall of the base part and the end of the hook part each have at least one bore and a bolt-nut connection serves as a connecting element for making a connection between them or a screw is passed through the end's bore and engages with the bore in the section wall. This embodiment utilizes the high stability of the proposed cross section, but it does not allow for adjustment. This can be achieved to a limited extent by designing one or both bores as elongated holes.

In a second embodiment, the section wall of the base part has a longitudinal groove the groove edges of which are bevelled towards the inside and the hook part is provided with a bore so that a screwed connection can be made between a moulded part which is supported and guided in the longitudinal groove and another moulded part which is passed through the bore, which moulded parts secure the end to the section wall which serves as a support. This embodiment utilizes the high stability of the proposed cross section and allows for adjustment parallel to the mounting plane of the base part. An additional height adjustment can be achieved if the bore in the end of the hook part is designed as an elongated hole.

The third embodiment is designed in a similar manner. Here, the section wall of the base part has a longitudinal slot extending in the longitudinal direction of the section and the end of the hook part is provided with a bore so that a screwed connection can be made between a moulded part which is slidably arranged below the longitudinal slot and another moulded part which is passed through the bore, which moulded parts secure the end to the section wall which serves as a support. Again, an additional height adjustment can be achieved if the bore in the end of the hook part is designed as an elongated hole.

The reduction in load-bearing capacity which is caused by the slot in the section wall can be compensated easily by additional section walls which are arranged within the triangular section and extend in the longitudinal direction thereof. The only condition placed on these section walls is that they must be arranged such that they not restrict the longitudinal displaceability of the moulded part. In the exemplary embodiment, such an arrangement is shown.

Unlike a groove formed in the solid material of the section wall, the slot variant described above has the advantage that less material is used.

Of course it is advantageous in all three embodiments if the inner surface of the end of the hook part and the section wall which serves as a support are profiled, preferably in the form of longitudinal indentations which engage with each other, to achieve a form-fit connection when they are joined. In this way, a screwed connection also prevents the hook part from rotating relative to the base part.

If longitudinal indentations are arranged on both sides of the groove or the slot and if the inner surface of the end of the hook part is also provided with longitudinal indentations, the upper portion of the angle leg which is flush with the section wall is additionally stabilized when the base and hook parts are connected to each other, i.e. this leg is prevented from bending outwards due to the load acting thereon via the hook part, as the portions of the section wall which are separated by the groove or the slot are form-fit connected and force-fit connected to each other by the end of the hook part.

All three variants have further in common that the base part can be made by cutting an aluminium extruded section. This is optimal from a production technology point of view.

To prevent the hook part from resting on the roof sheathing, it is intended that the portion of the hook part which is passed through the roof covering and the end of the hook part include an obtuse angle ($\beta$), wherein a $\alpha \leq \beta$, preferably by up to 10°.

BRIEF DESCRIPTION OF THE SEVERAL VIEWS OF THE DRAWINGS

Further details, advantages and features of the present invention result from the subsequent description with reference to the drawings. In the drawings.

DETAILED DESCRIPTION OF THE INVENTION

Figure 1:
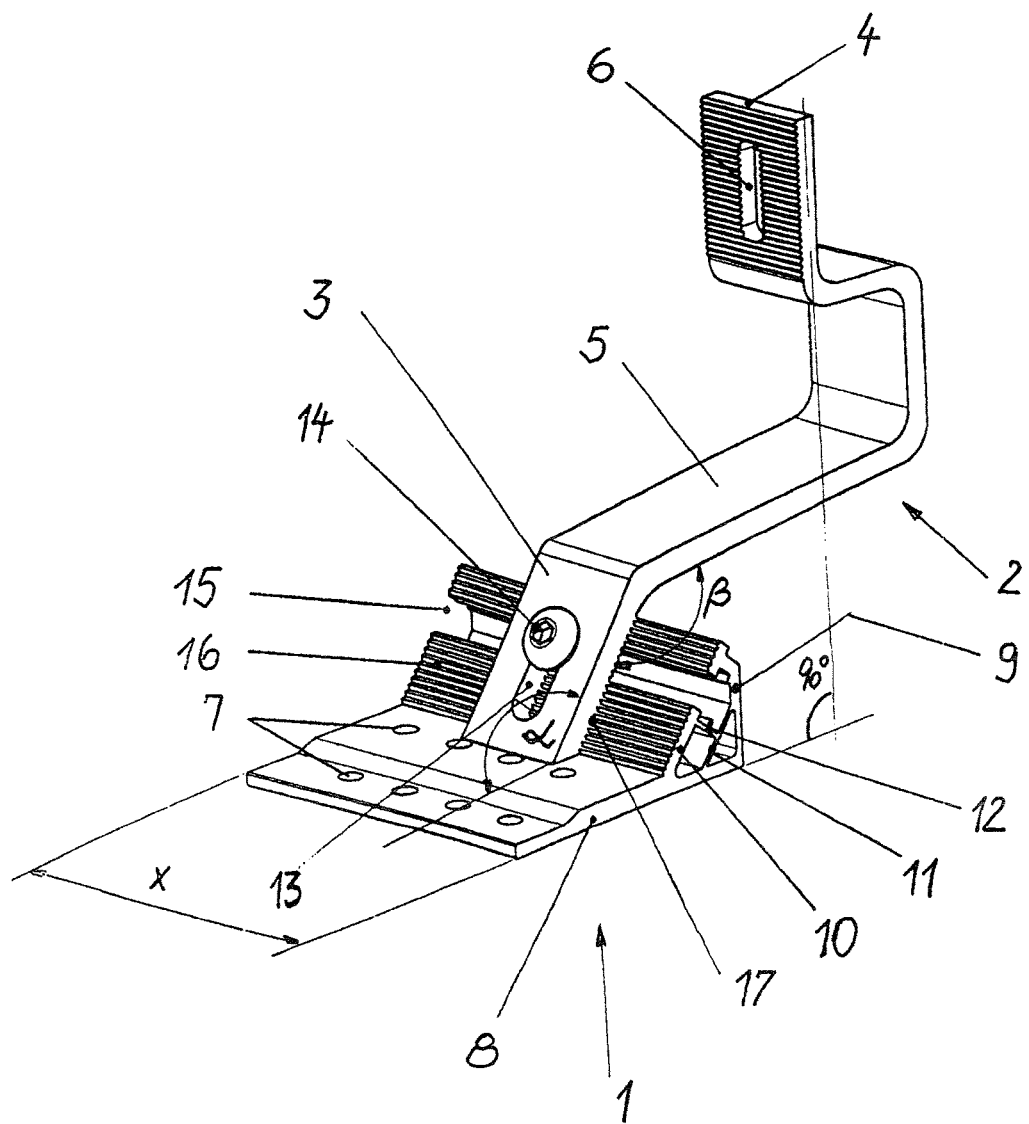
FIG. 1 shows one embodiment of the two part roof hook according to the invention.
Figure 2:
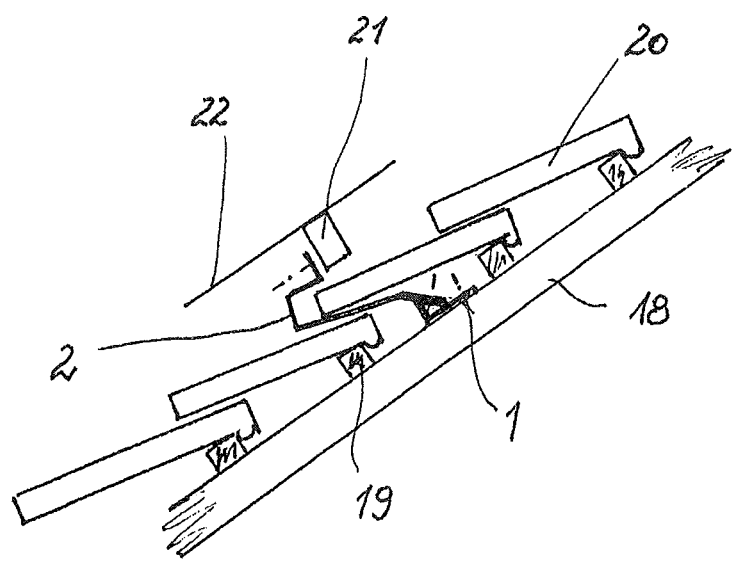
FIG. 2 shows the two part roof hook installed on a roof, with the base connected to the roof substructure below the roof covering and the hook part extending through the roof covering to support a solar module.

One embodiment is shown in the figures. The two-part roof hook illustrated there comprises a base part 1 for making a connection to a roof substructure 18 and a hook part 2 which can be connected at its first end (3) to the base part 1, which hook part is provided with a connecting element 6 on its other end 4 for mounting a support frame 21 or an assembly located above the roof covering (20). The roof covering may be, e.g., tiles resting on roof battens 19, and the assembly located above the roof may be, e.g., solar modules (22).

The base part 1 is a cut-off portion (X) of an angle section, one angle leg 8 of which has connecting elements 7 for making a connection to the roof substructure, which connecting elements 7 are spaced apart from the other angle leg 9.

Between the two angle legs 8, 9, which include a right angle here although the roof hook is not limited in this respect, a continuous section wall 10 is arranged within the angle, which section wall is provided with a longitudinal slot 15, includes an obtuse angle ($\alpha$) jointly with the angle leg area of the connecting elements 7, serves as a support surface for the end 3 of the hook part 2, and can be connected to the end 3 of the hook part 2 via the longitudinal slot 15.

For this purpose, a bore 13 in the form of an elongated hole is provided in the end 3 of the hook part 2 so that a screwed connection 14 can be made between a moulded part, preferably a nut, which is slidably arranged below the longitudinal slot 15 and another moulded part, preferably a bolt, which is passed through the bore 13, which moulded parts secure the end 3 to the section wall 10 which serves as a support.

To reinforce the transition area between the two angle legs 8, 9, an additional inner section wall 11 is arranged within the angle, which is spaced apart from the section wall 10 and preferably extends parallel to the outer section wall 10. Furthermore, a connecting section wall 12 is arranged between the section walls 10, 11.

The section wall 10 is flush with the outer edge of the angle leg 9 or is supported thereon. The upper end of the angle leg 9 can be slightly bevelled in the direction towards the section wall 10.

The inner surface of the end 3 and the section wall 10 which serves as a support are profiled, preferably, as shown, in the form of longitudinal indentations 16, 17 which engage with each other, to achieve a form-fit connection when they are joined.

If longitudinal indentations 16 are arranged on both sides of the longitudinal slot and if the inner surface of the end 3 of the hook part is also provided with longitudinal indentations 17, the upper portion of the angle leg 9 which is flush with the section wall 10 or made to be supported on the bevelled end thereof is additionally stabilized when the base and hook parts 1, 2 are connected to each other. This angle leg 9 is prevented from bending outwards due to the load acting thereon via the hook part 2, even under highest loads.

For reasons of material economy, it is intended that the angle leg 8 comprises a plane support surface for the roof substructure while its opposite upper surface has a step-like reduction in leg height at a distance from the angle leg 9.

With respect to the hook part 2 as such, it is intended that the portion 5 of the hook part 2 which is passed through the roof covering and the end 3 of the hook part include an obtuse angle ($\beta$), wherein a $\alpha \leq \beta$. The angle ($\beta$) preferably exceeds ($\alpha$) by up to 10°.

Furthermore, it is shown that the end 4 of the hook part 2, which serves as a connector, is arranged perpendicular to the plane of the connecting elements 7 when the base and hook parts 1, 2 have been connected to each other. Again, an elongated hole allows for height adjustment and longitudinal indentations or serrations are provided to support the force-fit connection achieved by screwing by means of a form-fit connection.

The proposed roof hook combines all advantages of known roof hooks and, in addition, allows for highly economical production.

Although the roof hook is designed, above all, to mount solar power systems on roofs, as has been described above, it is not limited to this particular use. Support frames for other components to be mounted on a roof, such as catwalks, snow guards, or even advertising, can also be mounted thereon.

LIST OF REFERENCE NUMERALS

1 Base part
2 Hook part
3 End of the hook part (2) which can be connected to the base part
4 End of the hook part (2) which serves as a connector
5 Portion of the hook part (2) which is passed through the roof covering
6 Connecting element of the end (4) of the hook part (2)
7 Connecting elements of the base part (1) to the roof substructure
8 Angle leg with connecting elements (7)
9 Angle leg
10 Section wall (support surface for the end (3))
11 Inner section wall
12 Connecting section wall 13 Bore in the end (3) of the hook part (2)
14 Screwed connection
15 Longitudinal slot in the section wall (10)
16 Longitudinal indentations
17 Longitudinal indentations
18 Roof rafter
19 Roof batten
20 Roof covering (e.g., tiles)
21 Support frame
22 Solar module

The invention claimed is:

1. A two-part roof hook having
a base part (1) for making a connection to a roof substructure below a roof covering,
a hook part (2) having first and second ends (3, 4) and connected to the base part (1) below the roof covering with a screw connector at its first end, which hook part has a connecting element (6) on its second end (4) for mounting a support frame or an assembly located above the roof covering and, between the two ends (3, 4), a hook-shaped middle portion (5) of the hook part (2) which is adapted to being conducted through the roof covering, and
a screw connector connecting the base part (1) to the hook part (2),
wherein the base part (1) is a cut-off portion (X) of a longitudinally extending angle section with first and second angle legs (8, 9) and a section wall (10), the first angle leg (8) having connecting elements (7) for making a connection to the roof substructure, wheren the connecting elements (7) are spaced apart from the second angle leg (9), wherein the section wall (10) of the base part extends in the longitudinal direction of the angle section and is arranged within an angle formed between the first and second angle legs (8, 9), wherein the section wall describes an obtuse angle ($\alpha$) jointly with the angle leg area of the connecting elements (7) of the first angle leg (8), serves as a support surface for the first end (3) of the hook part (2), and is releasably connected to the first end (3) of the hook part (2) with the screw connector, and
wherein the hook-shaped middle portion (5) of the hook part (2) and the first end (3) of the hook part join at an obtuse angle ($\beta$), wherein $\alpha \leq \beta$.

2. A two-part roof hook according to claim 1, wherein the angle ($\alpha$) is 110-145°.

3. A two-part roof hook according to claim 1, wherein the section wall (10) of the base part (1) has at least one bore, the first end (3) of the hook part (2) has at least one bore (13), and a bolt-nut connection serves as a connecting element for making a connection between them or a screw is passed through a bore (13) of the first end (3) and engages with a bore in the section wall (10).

4. A two-part roof hook according claim 1, wherein the section wall (10) of the base part (1) has a longitudinal groove, the groove edges of which are bevelled towards the inside, and the first end (3) of the hook part (2) is provided with a bore (13) so that a screwed connection (14) can be made between a moulded part which is supported and guided in the longitudinal groove and another moulded part which is passed through the bore (13), which moulded parts secure the first end (3) to the section wall (10) which serves as a support.

5. A two-part roof hook according to claim 1, wherein the section wall (10) of the base part has a longitudinal slot (15) extending in the longitudinal direction of the angle section and the first end (3) of the hook part (2) is provided with a bore (13) and a screwed connection (14) is made between a moulded part which is slidably arranged below the longitudinal slot (15) and another moulded part which is passed through the bore (13), which moulded parts secure the first end (3) to the section wall (10) which serves as a support.

6. A two-part roof hook according to claim 5, wherein additional section walls extending in the longitudinal direction of the section are arranged within the space enclosed by the section wall (10) and the angle legs (8, 9).

7. A two-part roof hook according to claim 5, wherein an additional inner section wall (11) is provided spaced apart from the section wall (10), interior of the section wall (10), and extending parallel to the section wall (10), such that inner section wall (11) is arranged within the space enclosed by the section wall (10) and the first and second angle legs (8, 9).

8. A two-part roof hook according to claim 7, wherein a connecting section wall (12) which connects the section walls (10, 11) is arranged between the section walls (10, 11).

9. A two-part roof hook according to claim 1, wherein at least one bore (13) in the first end (3) of the hook part (2) is designed as an elongated hole.

10. A two-part roof hook according to claim 1, wherein the inner surface of the first end (3) of the hook part (2) and the section wall (10) which serves as a support are profiled to achieve a form-fit connection when they are joined.

11. A two-part roof hook according to claim 1, wherein the second angle leg (9) has an outer edge, and wherein the section wall (10) is flush with the outer edge of the second angle leg (9) or is supported thereon.

12. A two-part roof hook according to claim 4, wherein the section wall (10) has longitudinal indentations (16) on both sides of the longitudinal groove or the longitudinal slot (15) and the inner surface of the first end (3) of the hook part is also provided with longitudinal indentations (17) so that the upper portion of the angle leg (9) which is flush with the section wall (10) or made to be supported on the bevelled end thereof is form-fit connected and force-fit connected via the first end (3) of the hook part (2) to the part of the section wall (10) which is connected to the angle leg (8) when the base and hook parts (1, 2) are connected to each other.

13. A two-part roof hook according to claim 1, wherein the angle leg (8) comprises a plane support surface for the roof substructure while its opposite upper surface has a step-like reduction in leg height at a distance from the angle leg (9).

14. A two-part roof hook having
a base part (1) for making a connection to a roof substructure below a roof covering,
a hook part (2) having first and second ends (3, 4) and connected to the base part (1) with a screw connector at its first end, which hook part has a connecting element (6) on its second end (4) for mounting a support frame or an assembly located above the roof covering and, between the two ends (3, 4), a hook-shaped middle portion (5) of the hook part (2) which is adapted to being conducted through the roof covering, and
a screw connector connecting the base part (1) to the hook part (2),
wherein the base part (1) is a cut-off portion (X) of a longitudinally extending angle section with first and second angle legs (8, 9) and a section wall (10), the first angle leg (8) having connecting elements (7) for making a connection to the roof substructure, wheren the connecting elements (7) are spaced apart from the second angle leg (9), wherein the section wall (10) of the base part extends in the longitudinal direction of the angle section and is arranged within an angle formed between the first and second angle legs (8, 9), wherein the section wall describes an obtuse angle ($\alpha$) jointly with the angle leg area of the connecting elements (7) of the first angle leg (8), serves as a support surface for the first end (3) of the hook part (2), and is releasably connected to the first end (3) of the hook part (2) with the screw connector, wherein the hook-shaped middle portion (5) of the hook part (2) and the first end (3) of the hook part join at an obtuse angle ($\beta$), wherein $\alpha \leq \beta$, and wherein the second end (4) of the hook part (2), which serves as a connector, is arranged perpendicular to the plane of the connecting elements (7) when the base and hook parts (1, 2) have been connected to each other.

15. A two-part roof hook according to claim 1, wherein the inner surface of the first end (3) of the hook part (2) and the section wall (10) which serves as a support are profiled in the form of longitudinal indentations (16, 17) which engage with each other, to achieve a form-fit connection when they are joined.

* * * * *